(12) United States Patent
Chikazawa et al.

(10) Patent No.: US 8,081,172 B2
(45) Date of Patent: Dec. 20, 2011

(54) PEN UNIT AND ELECTRONIC APPARATUS

(75) Inventors: Nagahisa Chikazawa, Kawasaki (JP);
Masahiko Kyouzuka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 720 days.

(21) Appl. No.: 12/179,196

(22) Filed: Jul. 24, 2008

(65) Prior Publication Data
US 2009/0008163 A1 Jan. 8, 2009

Related U.S. Application Data

(63) Continuation of application No. PCT/JP2006/301056, filed on Jan. 24, 2006.

(51) Int. Cl.
G06F 3/33 (2006.01)

(52) U.S. Cl. ..... 345/179; 345/157; 345/184; 178/19.01; 178/19.02; 178/19.03; 178/19.04; 178/19.05

(58) Field of Classification Search ............ 345/156, 345/173–179, 157, 184; 361/683, 686; 178/19.01–19.07
See application file for complete search history.

(56) References Cited

U.S. PATENT DOCUMENTS

| | | | | |
|---|---|---|---|---|
| 3,613,248 A | * | 10/1971 | McInnis | 33/18.1 |
| 3,838,211 A | * | 9/1974 | Joannou | 178/18.03 |
| 4,564,078 A | * | 1/1986 | Enokido et al. | 178/19.01 |
| 5,434,373 A | | 7/1995 | Komaki | |
| 5,864,098 A | * | 1/1999 | Shinohe | 178/19.01 |
| 7,374,359 B1 | * | 5/2008 | Annerino et al. | 401/258 |
| 7,479,946 B2 | * | 1/2009 | Fitch et al. | 345/173 |
| 7,623,121 B2 | * | 11/2009 | Dodge | 345/179 |
| 2003/0132918 A1 | * | 7/2003 | Fitch et al. | 345/173 |
| 2003/0189556 A1 | | 10/2003 | Chang et al. | |

FOREIGN PATENT DOCUMENTS

| | | |
|---|---|---|
| JP | 5-282090 | 10/1993 |
| JP | 5-92830 | 12/1993 |
| JP | 7-210292 | 8/1995 |
| JP | 8-147088 | 6/1996 |
| JP | 9-204265 | 8/1997 |
| JP | 10-307643 | 11/1998 |
| JP | 2003-223269 | 8/2003 |
| JP | 2003-330601 | 11/2003 |
| SG | 73562 * | 6/2000 |

OTHER PUBLICATIONS

International Preliminary Report on Patentability, mailed Aug. 7, 2008 and issued in corresponding International Patent Application No. PCT/JP2006/301056.

International Search Report, mailed Apr. 18, 2006 and issued in corresponding International Patent Application No. PCT/JP2006/301506.

* cited by examiner

*Primary Examiner* — Prabodh M Dharia
(74) *Attorney, Agent, or Firm* — Staas & Halsey LLP (57) ABSTRACT

A retention member holds a tip of a pen received in an inner space of a unit body through an opening. A narrowed path member is placed within the inner space at a position between a large-diameter member of the pen and the opening, when the retention member holds the pen. The large-diameter member expands outward from the outer peripheral surface of the pen by a predetermined amount. The narrowed path member contacts the large-diameter member when the pen is released from the retention member, and creates enough interference to prevent the pen from falling out of the unit body, but otherwise allows the pen to be drawn out of the opening.

30 Claims, 13 Drawing Sheets

PEN UNIT AND ELECTRONIC APPARATUS

This application is a continuation application filed under 35 U.S.C. 111(a) claiming the benefit under 35 U.S.C. 120 and 365(c) of International Application No. PCT/JP2006/301056, filed Jan. 24, 2006, the disclosure of which is hereby incorporated by reference.

BACKGROUND OF THE INVENTION

1. Field of the Invention

The present invention relates to a pen unit including a pen such as a stylus pen, and a unit body enclosing the pen within an inner space.

2. Description of the Prior Art

A pen unit incorporated in a notebook personal computer is well known, for example. The pen unit defines an inner space extending from an opening. A stylus pen is inserted into the inner space. The stylus pen is held or retained within the inner space. When the stylus pen is further pushed inward from the opening, the stylus pen is released from restraint. A driving force is then applied to the tip end of the stylus pen to direct the stylus pen toward the opening. The driving force allows the stylus pen to protrude out of the opening by a predetermined protruding amount. A user can thus pinch the stylus pen protruding out of the opening with his/her fingers.

An elastic piece contacts the stylus pen kept under restraint. Friction between the elastic piece and the stylus pen serves to restrict the movement of the stylus pen. The stylus pen is in this manner prevented from dropping off. The protruding amount of the stylus pen is controlled.

The stylus pen and the elastic piece are molded from a resin material, for example. The stylus pen and the elastic piece often suffer from dimensional errors. The dimensional errors cause a reduction in the friction between the elastic piece and the stylus pen. The stylus pen thus shoots out of the opening immediately after when the stylus pen has been released from the restraint. The stylus pen tends to drop out of the opening. On the other hand, an increased friction serves to interrupt the movement of the stylus pen. In this case, the stylus pen cannot protrude out of the opening at a sufficient protruding amount.

SUMMARY OF THE INVENTION

It is accordingly an object of the present invention to provide a pen unit allowing a pen to reliably protrude out of an opening by a predetermined protruding amount.

According to the present invention, there is provided a pen unit comprising: a unit body defining an inner space extending from an opening in one direction; a retention member designed to hold a pen received in the inner space through the opening; a driving mechanism designed to apply a driving force to the pen to direct the pen toward the opening; and a narrowed path member placed within the inner space at a position spaced from a large-diameter member between the large-diameter member and the opening when the retention member holds the pen, the large-diameter member expanding outward from the outer peripheral surface of the pen by a predetermined amount, the narrowed path member receiving contact of the large-diameter member when the pen is released from the retention member, the narrowed path member allowing the large-diameter member to pass therethrough.

The pen unit allows the retention member to hold or retain a pen when the pen is enclosed in the inner space of the unit body. The narrowed path member is placed within the inner space at a position spaced from the large-diameter member between the large-diameter member and the opening of the unit body. The large-diameter member expands outward from the outer peripheral surface of the pen by a predetermined amount. When the pen is released from the restraint of the retention member, the driving mechanism applies a driving force to the pen to direct the pen toward the opening. The pen moves within the inner space. The narrowed path member inevitably contacts with the large-diameter member. This results in restriction of the movement of the pen. The pen is thus reliably prevented from dropping out of the opening.

In addition, when the pen is held at the retention member, the narrowed path member is placed within the inner space at a position spaced from the large-diameter member by a predetermined distance L between the large-diameter member and the opening, for example. The movement distance of the large-diameter member or pen thus corresponds to the distance L. The pen is allowed to reliably protrude out of the opening by the length equivalent to the distance L. Subsequently, when a user pulls the pen out of the opening, the narrowed path member allows the pen to pass therethrough. The pen is thus completely pulled out.

The narrowed path member may be made of an elastic body. The narrowed path member is thus capable of absorbing the impact of the contact with the pen. The large-diameter member may be mounted on the pen. The large-diameter member may be made of an elastic body. The large-diameter member can thus be utilized as the grip of the pen. A user is allowed to enjoy a good feeling for holding the pen in his/her hand. The large-diameter member may be formed integral with the pen. The retention member may be designed to hold the tip end of the pen. The driving mechanism may be designed to apply a driving force to the tip end of the pen.

The pen unit may be incorporated in an electronic apparatus, for example. The electronic apparatus may comprise: an enclosure; a main body defining an inner space extending in one direction from an opening defined in the enclosure; a retention member designed to hold a pen received in the inner space through the opening; a driving mechanism designed to apply a driving force to the pen to direct the pen toward the opening; and a narrowed path member placed within the inner space at a position spaced from a large-diameter member between the large-diameter member and the opening when the retention member holds the pen, the large-diameter member expanding outward from the outer peripheral surface of the pen by a predetermined amount, the narrowed path member receiving contact of the large-diameter member when the pen is released from the retention member, the narrowed path member allowing the large-diameter member to pass therethrough.

BRIEF DESCRIPTION OF THE DRAWINGS

The above and other objects, features and advantages of the present invention will become apparent from the following description of the preferred embodiments in conjunction with the accompanying drawings, wherein.

DESCRIPTION OF THE PREFERRED EMBODIMENTS

Figure 1:
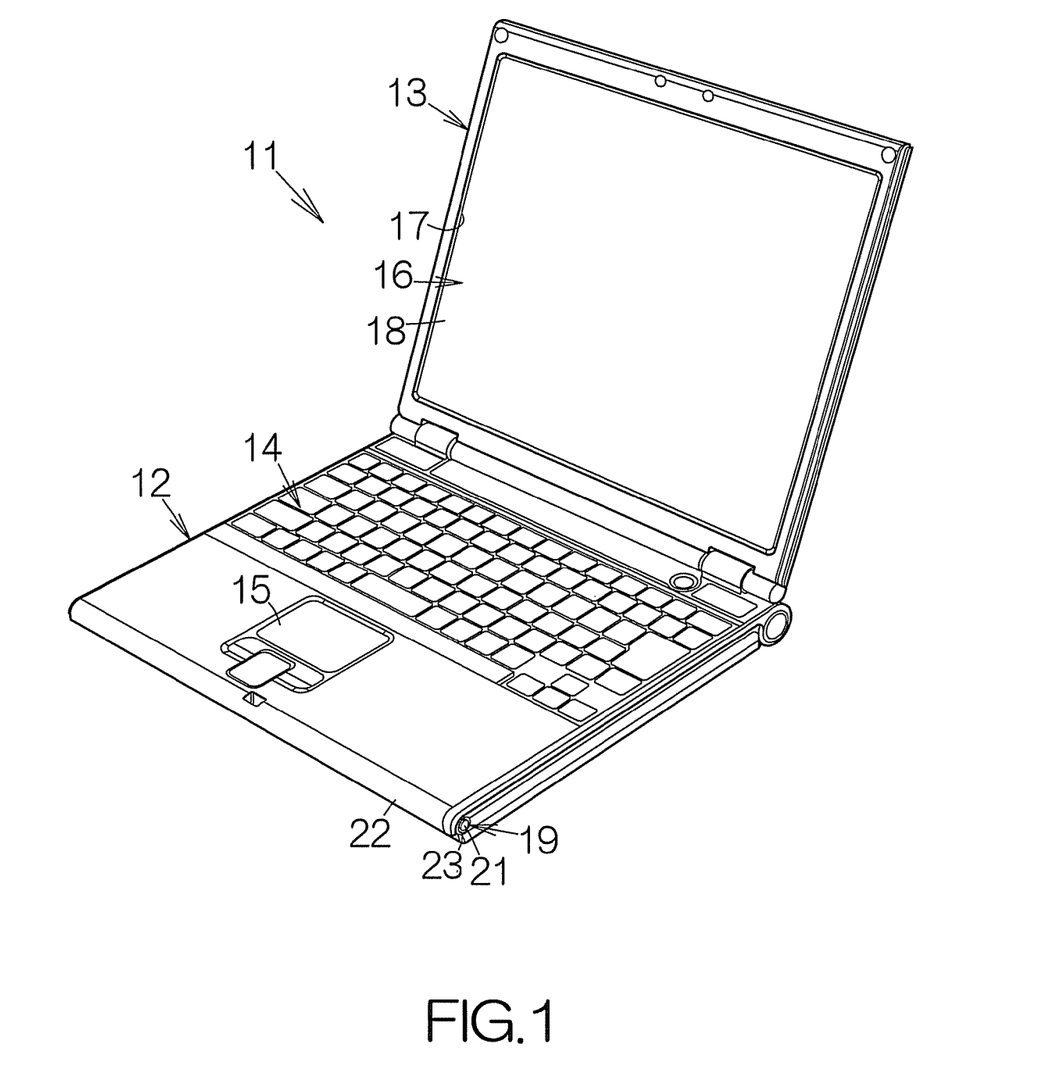
FIG. 1 is a perspective view schematically illustrating a notebook personal computer as a specific example of an electronic apparatus according to the present invention.

FIG. 1 schematically illustrates a notebook personal computer 11 as a specific example of an electronic apparatus according to the present invention. The notebook personal computer 11 includes a thin main body 12 and a display enclosure 13. The display enclosure 13 is coupled to the main body 12 for relative swinging or pivotal movement. Input devices such as a keyboard 14 and a pointing device 15 are embedded in the surface of the main body 12. Users manipulate the keyboard 14 and/or the pointing device 15 to input commands and/or data.

A liquid crystal display (LCD) panel module 16 is incorporated in the display enclosure 13, for example. The screen of the LCD panel module 16 is exposed in a window opening 17 defined in the display enclosure 13. Text data and graphics appear on the screen. Users can see the ongoing operation of the notebook personal computer 11 based on the appearing text data and graphics. The display enclosure 13 can be superposed on the main body 12 through the pivotal movement relative to the main body 12.

An input device such as a touch screen panel 18 is placed on the surface of the LCD panel module 16. A pen unit 19 is incorporated in the main body 12. The pen unit 19 includes a stylus pen 21. The stylus pen 21 is inserted into an enclosure 22 of the main body 12 through an opening 23 defined in the side of the enclosure 22. Various kinds of commands and/or data can be input to a CPU from the touch screen panel 18 in response to the operation of the stylus pen 21.

Figure 2:
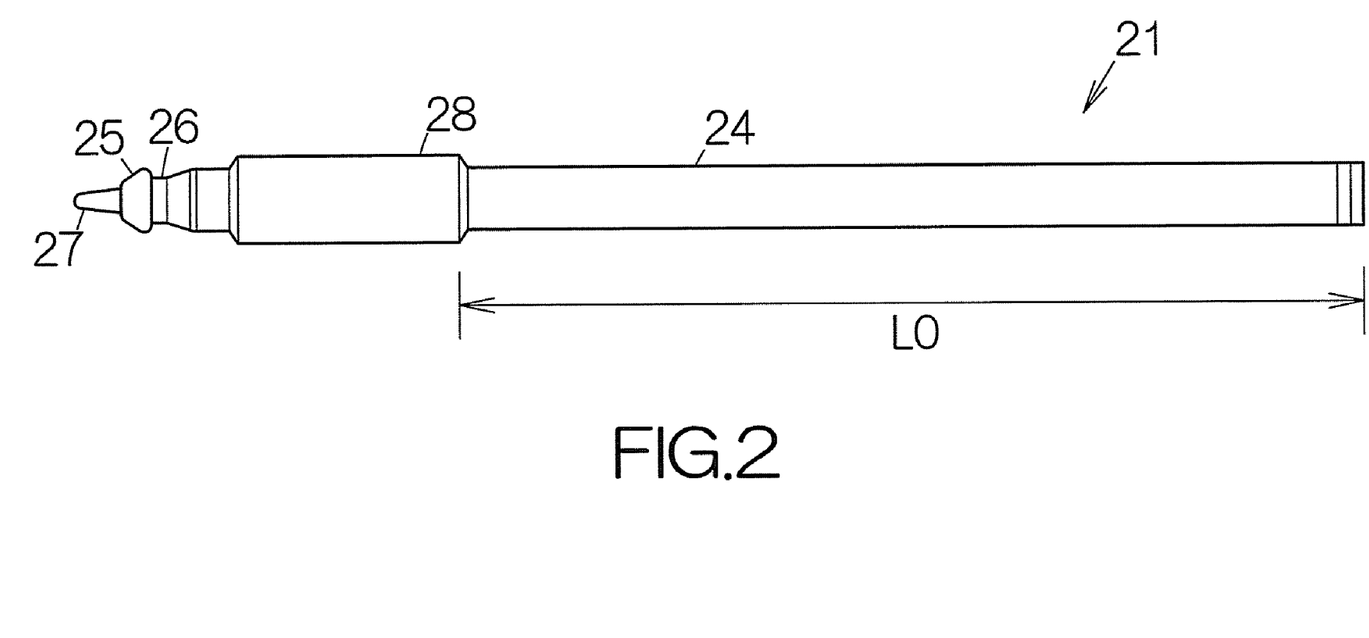
FIG. 2 is a plan view schematically illustrating a stylus pen.

As shown in FIG. 2, the stylus pen 21 includes a shaft 24 and a tip end piece 25 set continuous with the front or tip end of the shaft 24. A constriction 26 connects the shaft 24 to the tip end piece 25. The constriction 26 has a diameter smaller than the diameters of the shaft 24 and the tip end piece 25. A pen point 27 is defined in the tip end piece 25. Users touch the touch screen panel 18 with the pen point 27 to operate the touch screen panel 18. The shaft 24 has the constant cross section from the front end to the rear end thereof. The cross section of the shaft 24 is defined along the contour projected on a plane perpendicular to the longitudinal axis of the shaft 24. A straight line represents the longitudinal axis of the shaft 24.

A large-diameter member 28 is formed integral with the shaft 24. A molding process may be employed to form such a one-piece component. The large-diameter member 28 and the shaft 24 may be made of a resin material, for example. The large-diameter member 28 expands from the outer peripheral surface of the shaft 24 by a predetermined amount. Here, the large-diameter member 28 may endlessly extend on the outer peripheral surface of the shaft 24 around the longitudinal axis of the shaft 24. A distance L0 is established between the rear end of the large-diameter member 28 and the rear end of the shaft 24.

Figure 3:
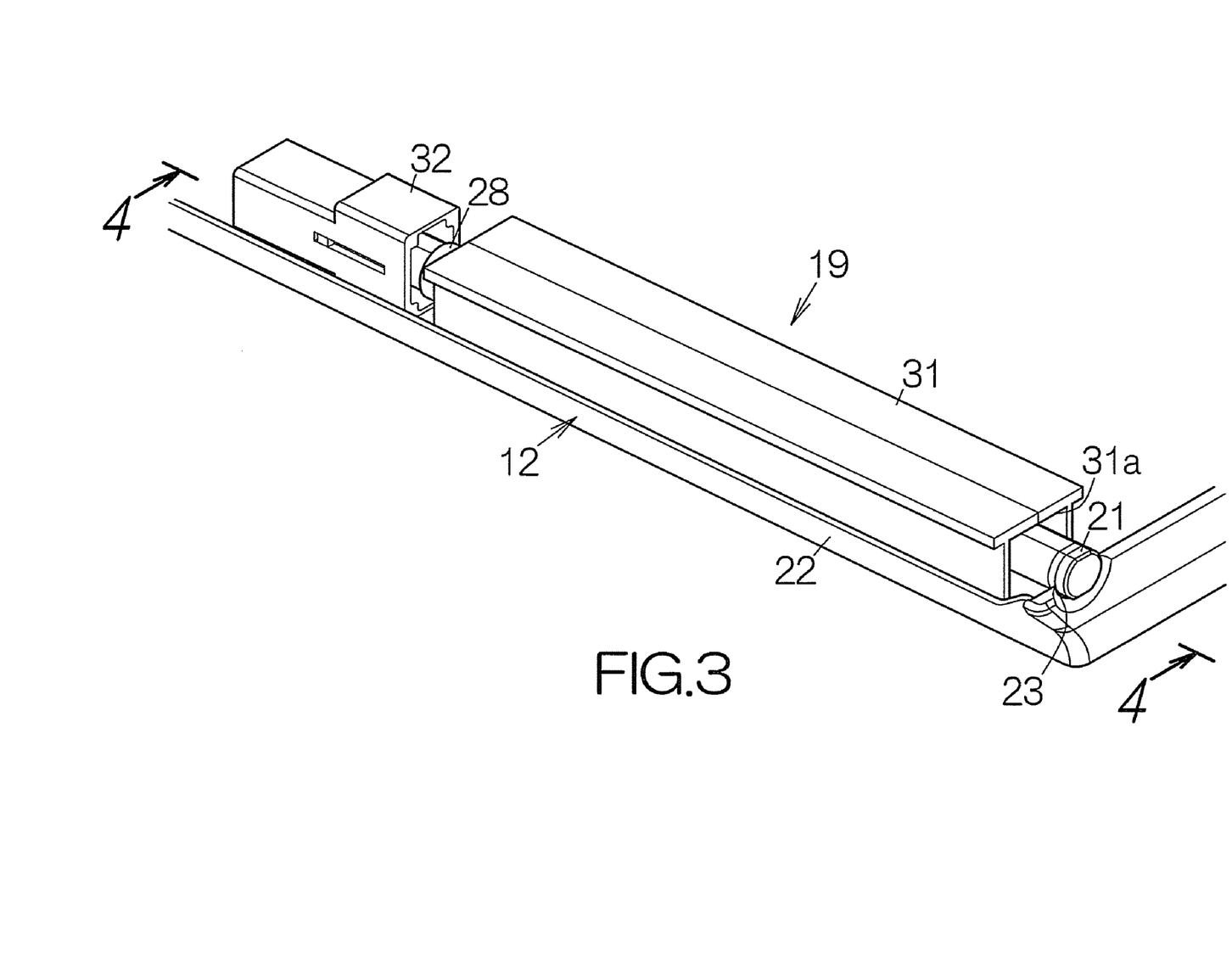
FIG. 3 is a perspective view schematically illustrating a pen unit according to an embodiment of the present invention.

As shown in FIG. 3, the pen unit 19 includes a unit body 31 enclosed in the enclosure 22, and a pen holding mechanism 32 placed at a position backward from the unit body 31. The unit body 31 is formed in the shape of a casing. An opening 31a is defined in the front end of the unit body 31. The unit body 31 opposes the opening 31a to the opening 23 of the enclosure 22. The unit body 31 may be molded from a resin material, for example. The unit body 31 and the pen holding mechanism 32 may be fixed on the bottom plate of the enclosure 22, for example. A screw or screws, not shown, may be employed to fix the unit body 31 and the pen holding mechanism 32.

The unit body 31 defines an inner space extending in one direction from the opening 31a. The stylus pen 21 is enclosed in the inner space. The stylus pen 21 is designed to insert the tip end first into the inner space through the opening 23. The tip end of the stylus pen 21 is held or retained at the pen holding mechanism 32. The rear end of the stylus pen 21 may protrude out of the opening 23 by a predetermined amount.

Figure 4:
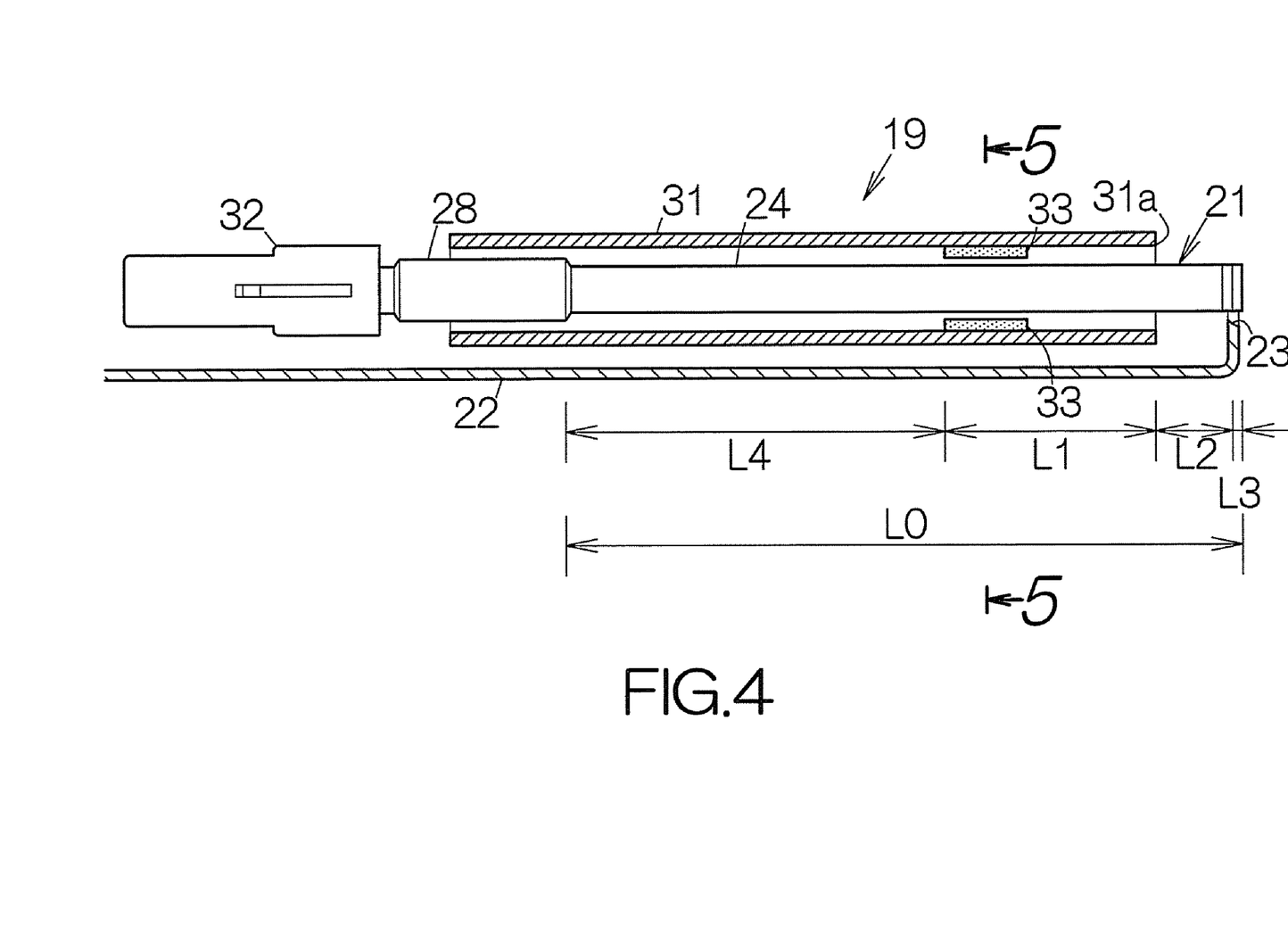
FIG. 4 is a partial sectional view, taken along the line 4-4 in FIG. 3, schematically illustrating a status where the tip end of the stylus pen is held or retained.

As shown in FIG. 4, a pair of narrowed path members 33, 33 is disposed within the inner space of the unit body 31, for example. The narrowed path members 33 may be attached to the inner surface of the unit body 31. An adhesive may be employed for the attachment. The narrowed path members 33 are made of elastic bodies, respectively. The elastic bodies may be made of an elastic resin material such as a rubber sponge, for example.

A distance L1 is established between the front ends of the narrowed path members 33 and the opening 31a. A distance L2 can be set between the opening 31a and the opening 23 depending on the relative position between the enclosure 22 and the unit body 31. Determination of the protruding amount of the stylus pen 21, namely of the distance L3 between the rear end of the stylus pen 21 and the opening 23, when the pen holding mechanism 32 holds the stylus pen 21, leads to determination of a distance L4 between the rear end of the large-diameter member 28 and the front ends of the narrowed path members 33 based on the distances L0, L1, L2 and L3. When the stylus pen 21 is held at the pen holding mechanism 32, the narrowed path members 33 are placed within the inner space at a position spaced from the large diameter member 28 by the distance L4 between the large-diameter member 28 and the opening 23.

Figure 5:
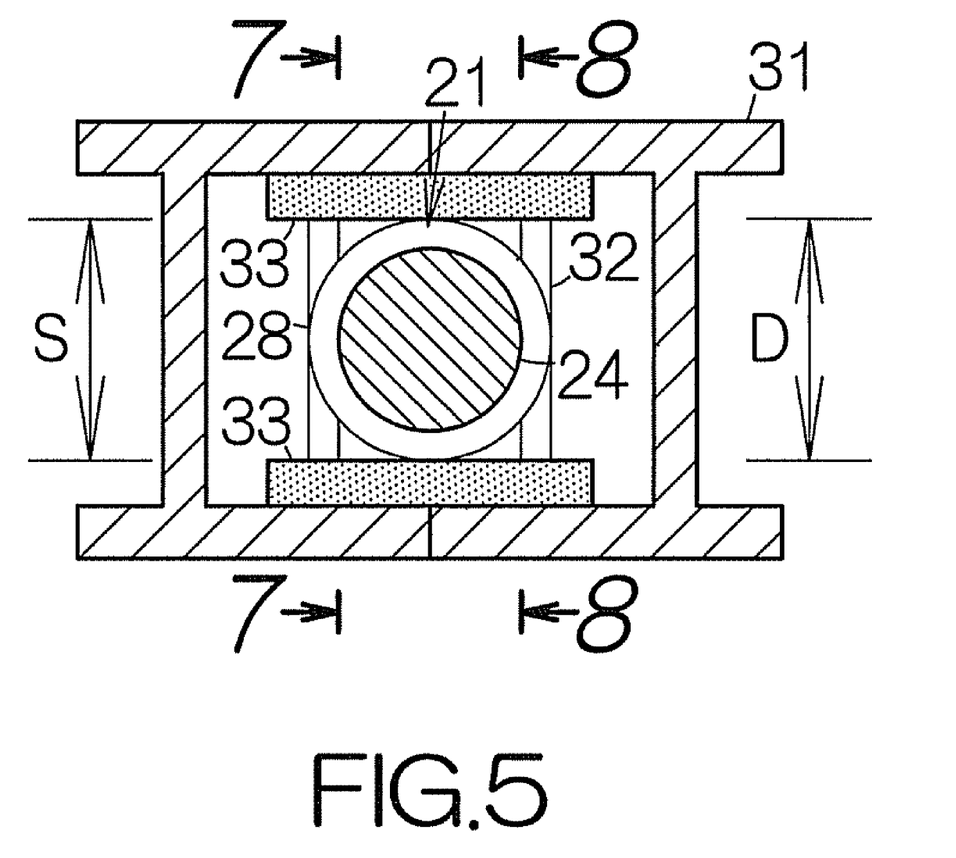
FIG. 5 is a partial sectional view taken along the line 5-5 in FIG. 4.

As shown in FIG. 5, an interval S between the narrowed path members 33, 33 may be determined depending on the outer diameter D of the large-diameter member 28. Specifically, the interval S may be set large enough to allow the large-diameter member 28 to pass therethrough. The interval S is not necessarily equal to the outer diameter D of the large-diameter member 28. Even if the interval S is smaller than the outer diameter D of the large-diameter member 28, the large-diameter member 28 may pass through a space between the narrowed path members 33, 33 based on elastic deformation of the narrowed path members 33. The large-diameter member 28 is required to have the outer diameter D of the sufficient dimension as described later in detail.

Now, assume that the stylus pen 21 is pulled out of the inner space. When a user pushes the rear end of the stylus pen 21 to allow the stylus pen 21 to move into the inner space, the pen holding mechanism 32 serves to apply a driving force to the tip end of the stylus pen 21 to direct the stylus pen 21 toward the opening 23. The driving force is oriented in the direction of the longitudinal axis of the stylus pen 21. The pen holding mechanism 32 subsequently releases the stylus pen 21 from the restraint. The shaft 24 thus protrudes out of the opening 23. The large-diameter member 28 moves toward the opening 23.

Figure 6:
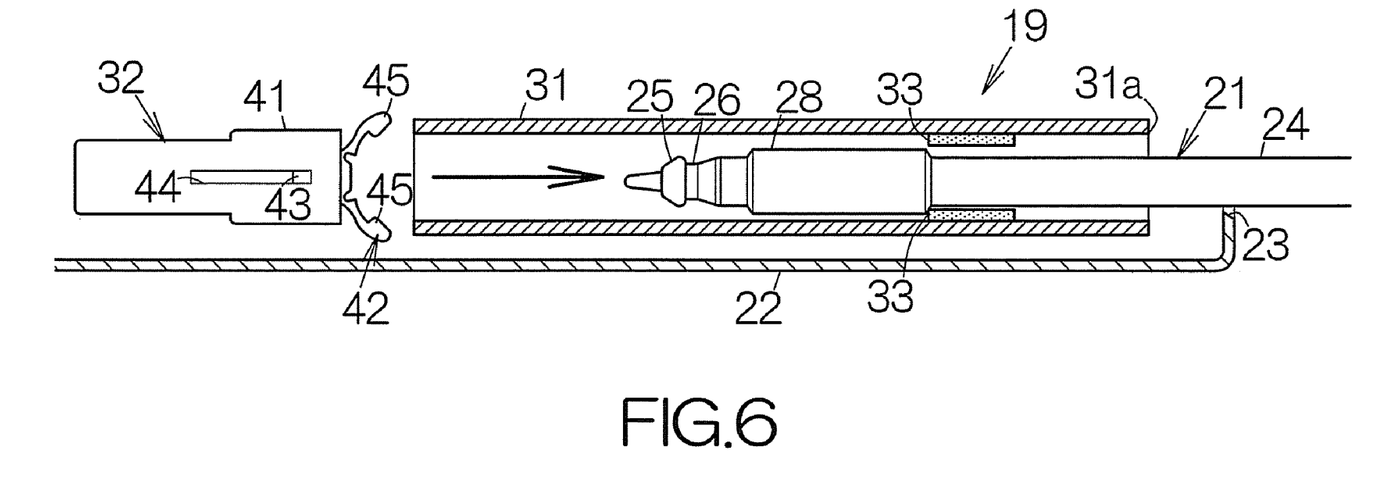
FIG. 6 is a partial sectional view, corresponding to FIG. 4, schematically illustrating a status where the rear end of an large-diameter member contacts with the front ends of narrowed path members.

No guiding member guides the movement of the stylus pen 21. The attitude of the stylus pen 21 is thus allowed to change inside the inner space. The longitudinal axis of the stylus pen 21 is hardly aligned with the intermediate position between the narrowed path members 33, 33. When the longitudinal axis of the stylus pen 21 in this manner deviates from the intermediate position, the rear end of the large-diameter member 28 inevitably contacts with the front end of the narrowed path member 33, as shown in FIG. 6. This results in restriction of the movement of the stylus pen 21. The stylus pen 21 is reliably prevented from dropping out of the opening 23.

When the stylus pen 21 is held at the pen holding mechanism 32, the distance L4 is established between the rear end of the large-diameter member 28 and the front ends of the narrowed path members 33 as described above. The movement distance of the large-diameter member 28 or stylus pen 21 corresponds to the distance L4. The stylus pen 21 is thus allowed to reliably protrude from the opening 23 of the enclosure 22 by the length of (L4+L3). A user can pinch the shaft 24 with his/her fingers. The user can then pull the stylus pen 21 out of the opening 23. The narrowed path members 33, 33 define a space enough to allow the large-diameter member 28 to pass therethrough. The stylus pen 21 can completely be pulled out of the opening 23 in this manner.

Next, assume that the stylus pen 21 is inserted into the inner space. The tip end of the stylus pen 21 is inserted into the inner space through the opening 23. The rear ends of the narrowed path members 33, 33 contact with the front end of the large-diameter member 28. When a user further pushes the stylus pen 21 inward, the large-diameter member 28 is allowed to pass through a space between the narrowed path members 33. The tip end of the stylus pen 21 in this manner reaches the pen holding mechanism 32. The pen holding mechanism 32 then catches the tip end of the stylus pen 21, as shown in FIG. 4.

As shown in FIG. 6, the pen holding mechanism 32 includes a retention member 42 enclosed in a casing 41. The retention member 42 is designed to move between a forward position and a backward position relative to the casing 41. A guide piece 43 is coupled to the retention member 42 within the casing 41. The guide piece 43 is received in an elongated opening 44 formed in the casing 41. The guide piece 43 moves within the elongated opening 44 in response to the movement of the retention member 42. The elongated opening 44 in this manner serves to prevent the retention member 42 from dropping off.

Figure 7:
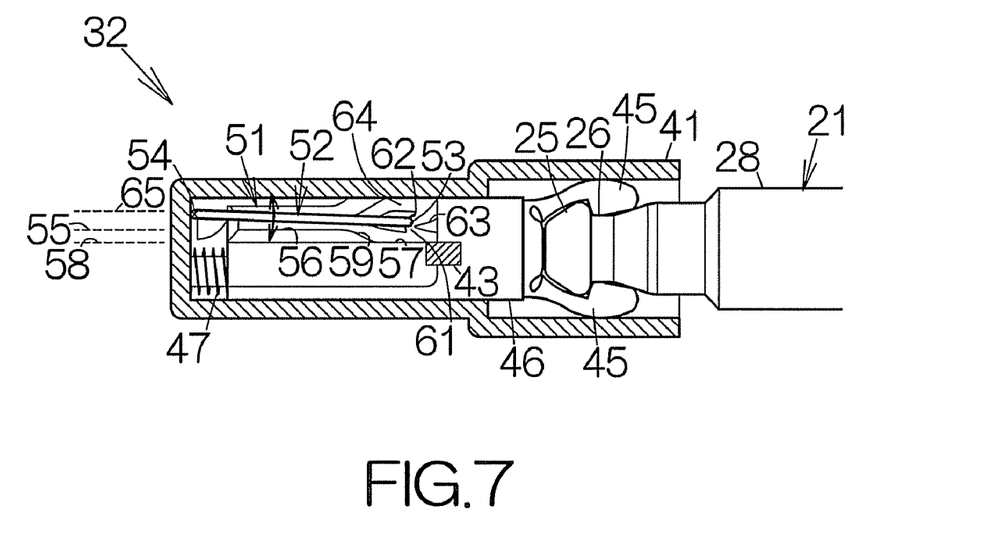
FIG. 7 is an enlarged partial sectional view taken along the line 7-7 in FIG. 5.

The retention member 42 includes a pair of hooks 45, 45. The hooks 45 are formed integral with each other as a one-piece component. A molding process is employed to form such a one-piece component. The retention member 42 is provided with an elastic force to distance the hooks 45 away from each other. When the retention member 42 reaches the forward position, the retention member 42 protrudes out of the casing 41. The hooks 45 are released from the restraint of the casing 41. The hooks 45, 45 thus open. As shown in FIG. 7, when the retention member 42 moves toward the backward position, the casing 41 contacts the hooks 45 to close the hooks 45. The hooks 45 get closer to each other to retain the tip end piece 25 of the stylus pen 21. The hooks 45 engage with the constriction 26 of the stylus pen 21. The stylus pen 21 is thus prevented from dropping off.

A movable block 46 is enclosed in the casing 41. The retention member 42 and the guide piece 43 are fixed to the movable block 46. The retention member 42 and the guide piece 43 may be formed integral with the movable block 46. An elastic member, namely a coil spring 47, is interposed between the movable block 46 and the casing 41. The coil spring 47 exhibits an elastic or resilient force driving the retention member 42 to the forward position. An elastic or resilient force is gradually stored up in the coil spring 47 during the movement of the retention member 42 from the forward position to the backward position.

The movable block 46 defines a pair of side surfaces within imaginary vertical planes extending in parallel with each other. As is apparent from FIG. 7, a first cam groove 51 is formed in one side surface of the movable block 46. A first tip end 53 of a guide arm 52 is received in the first cam groove 51. The guide arm 52 is designed to swing around a rotation axis 54 extending in the horizontal direction. The swinging movement of the guide arm 52 allows the first tip end 53 to move on an arc around the rotation axis 54.

The first cam groove 51 includes a first horizontal groove 56 extending forward from the rear end of the movable block 46. The first horizontal groove 56 is set at a first level 55. A second horizontal groove 57 is connected to the front end of the first horizontal groove 56. The second horizontal groove 57 is designed to extend at a second level 58 lower than the first level 55. The first horizontal groove 56 and the second horizontal groove 57 may be connected to each other through a moderate inclined surface 59.

A vertical groove 61 is connected to the front end of the second horizontal groove 57. The vertical groove 61 extends in the vertical direction along the front end of the movable block 46. A depression 62 is formed in the vertical groove 61. The depression 62 sinks in the backward direction. A slope 63 is opposed to the depression 62. The slope 63 extends upward in the vertical direction as the position gets farther in the forward direction. A third horizontal groove 64 is connected to the upper end of the vertical groove 61. The third horizontal groove 64 extends in parallel with the second horizontal groove 57 at a third level 65 higher than the first level 55. The tip end of the third horizontal groove 64 is connected to the first horizontal groove 56. When the stylus pen 21 is held in the pen holding mechanism 32, the first tip end 53 is received in the depression 62. Since the coil spring 47 applies a driving force to the movable block 46 in the forward direction, the first tip end 53 is reliably held in the depression 62. The retention member 42 is held within the casing 41.

Figure 8:
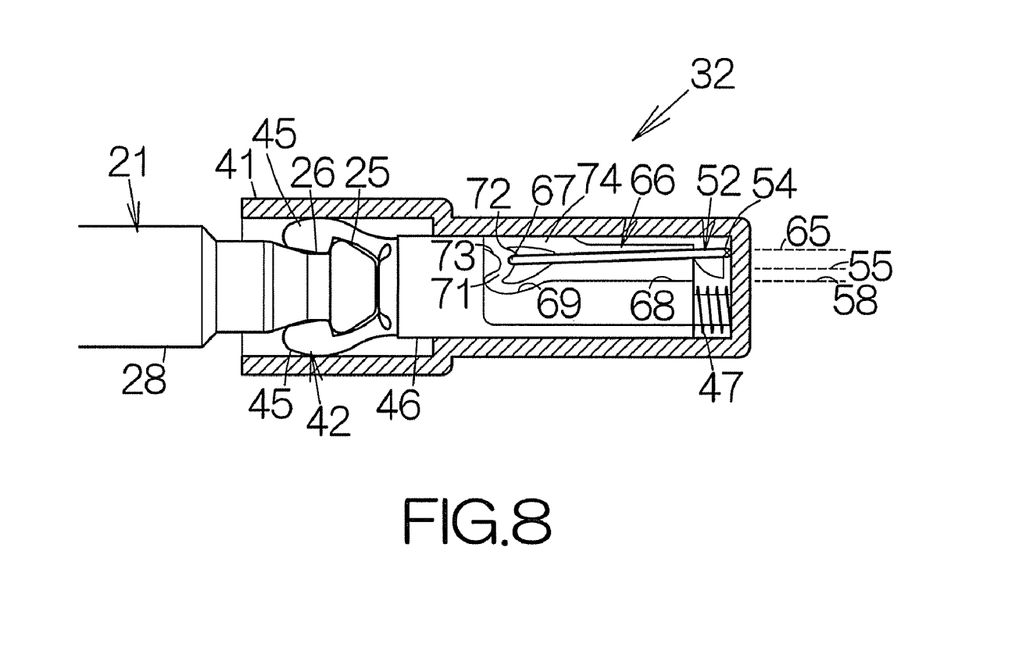
FIG. 8 is an enlarged partial sectional view taken along the line 8-8 in FIG. 5.

As shown in FIG. 8, a second cam groove 66 is formed in the other side surface of the movable block 46. A second tip end 67 of the guide arm 52 is received in the second cam groove 66. The second tip end 67 has a form symmetric to the first tip end 53 relative to a symmetric plane parallel to the aforementioned imaginary vertical planes. The swinging movement of the guide arm 52 allows the second tip end 67 to move on an arc around the rotation axis 54 in the same manner as described above.

The second cam groove 66 includes a first horizontal groove 68 extending forward from the rear end of the movable block 56. The second cam groove 66 is set at the second level 58. A curved groove 69 is connected to the front end of the first horizontal groove 68. The curved groove 69 is designed to extend downward to a level lower than the second level 58 and then upward to the second level 58. A vertical groove 71 is connected to the tip end of the curved groove 69. A depression 72 is formed in the vertical groove 71 in the same manner as described above. The depression 72 sinks in the backward direction. Here, the lower end of the depression 72 is set at the second level 58. A slope 73 is opposed to the depression 72. The slope 73 extends upward in the vertical direction as the position gets farther in the forward direction. A second horizontal groove 74 is connected to the upper end of the vertical groove 71. The second horizontal groove 74 is designed to extend at the third level 65. The tip end of the second horizontal groove 74 is connected to the first horizontal groove 68. When the stylus pen 21 is held in the pen holding mechanism 32, the second tip end 67 is received in the depression 72. Since the coil spring 47 applies a driving force to the movable block 46 in the forward direction, the second tip end 67 is reliably held in the depression 72.

Figure 9:
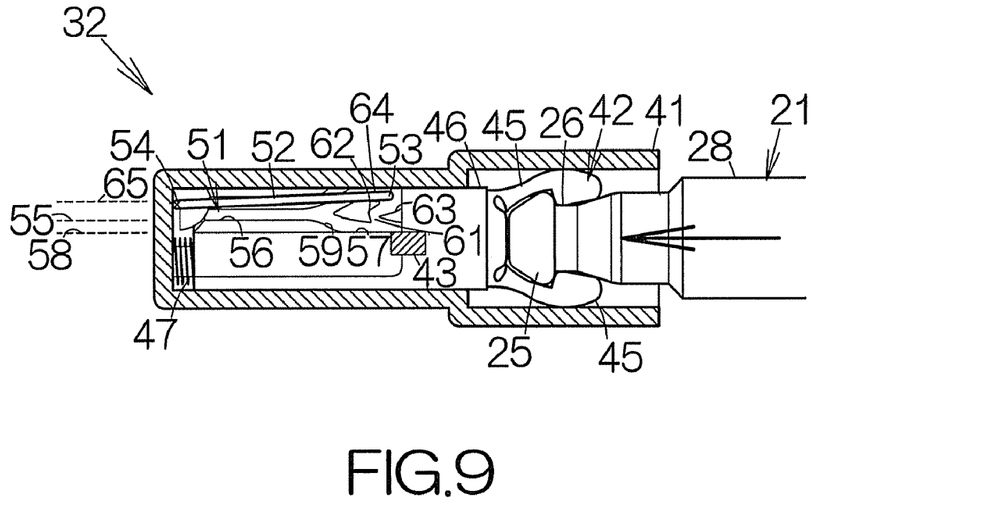
FIG. 9 is a partial sectional view, corresponding to FIG. 7, schematically illustrating a status where the stylus pen is pushed inward.

Now, assume that the stylus pen 21 is released from the pen holding mechanism 32. When the stylus pen 21 is pushed into the casing 41 of the pen holding mechanism 32 against the elastic or resilient force of the coil spring 47, the movable block 46 moves backward toward the backward position. The first tip end 53 (the second tip end 67) of the guide arm 52 slides along the corresponding slope 63 (73). The first tip end 53 (the second tip end 67) in this manner moves upward in the vertical direction along the vertical groove 61 (71). The first tip end 53 (the second tip end 67) thus reaches the third level 65, as shown in FIG. 9. The first tip end 53 (the second tip end 67) is received in the second horizontal groove 64 (74).

In this case, the elastic or resilient force of the coil spring 47 drives the movable block 46 forward. The forward movement of the movable block 46 allows the movement of the first tip end 53 (the second tip end 67) from the second groove 54 (74) to the first groove 56 (68). When the movable block 46 in this manner reaches the forward position, the guide piece 43 is received on the front end of the elongated opening 44. The elastic or resilient force of the coil spring 47 generates a driving force applied to the tip end of the stylus pen 21 toward the opening 23.

Figure 10:
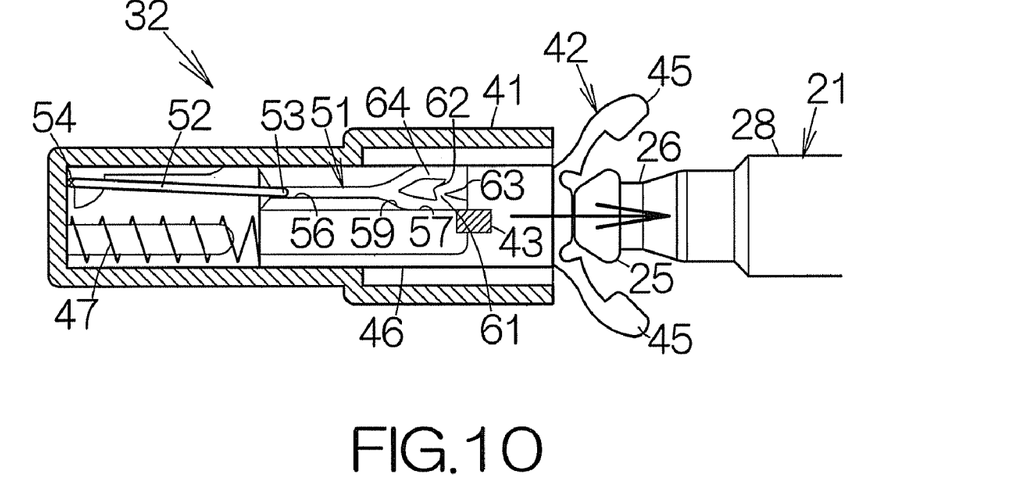
FIG. 10 is a partial sectional view, corresponding to FIG. 7, schematically illustrating a status where the tip end of the stylus pen receives a driving force directed toward an opening.

As shown in FIG. 10, when the retention member 42 reaches the forward position, the retention member 42 protrudes out of the casing 41. The hooks 45 are thus released from the restraint of the casing 41. An elastic force is applied to the hooks 45, 45 to distance the hooks 45, 45 away from each other. The hooks 45, 45 open. The tip end piece 25 of the stylus pen 21 is disengaged from the retention member 42. The tip end piece 25 of the stylus pen 21 is released from the restraint of the retention member 42. The stylus pen 21 can thus be removed.

Next, assume that the stylus pen 21 again gets caught in the pen holding mechanism 32. When the tip end piece 25 of the stylus pen 21 is received on the retention member 42, the retention member 42 moves toward the backward position. The hooks 45 thus contact with the casing 41 so that the hooks 45 get closed. The tip end piece 25 of the stylus pen 21 is in this manner retained between the hooks 45. The hooks 45 engage with the constriction 26 of the stylus pen 21.

Figure 11:
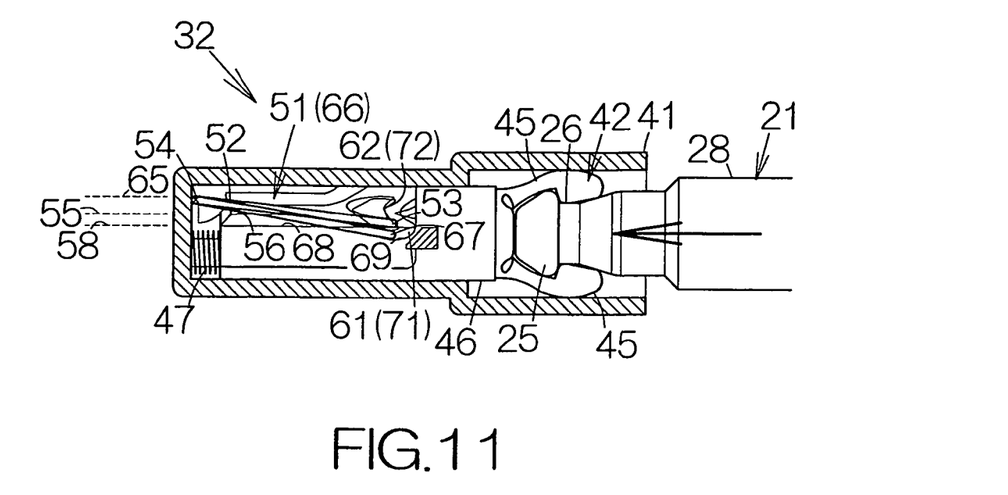
FIG. 11 is a partial sectional view, corresponding to FIG. 7, schematically illustrating a status where the stylus pen is pushed inward.

The movable block 46 likewise moves toward the backward position. An elastic or resilient force is stored up in the coil spring 47. The first tip end 53 moves from the first horizontal groove 56 into the second horizontal groove 57, as shown in FIG. 11. The first tip end 53 is kept at the second level 58. On the other hand, the second tip end 67 moves from the first horizontal groove 68 into the curved groove 69. The second tip end 67 moves downward to a position lower than the second level 58. The guide arm 52 allows the second tip end 67 to move on an arc having a radius larger than that of an arc on which the first tip end 53 moves. Torsion is thus generated in the guide arm 52.

Figure 12:
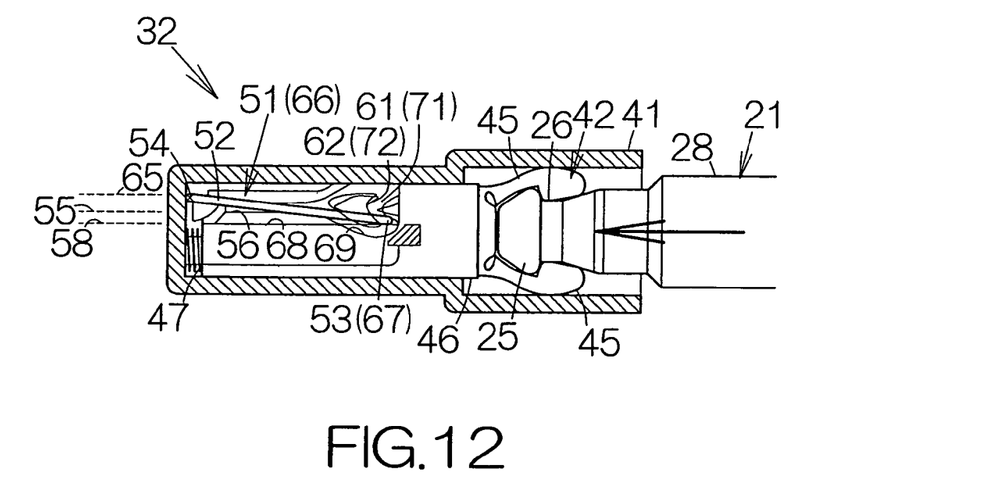
FIG. 12 is a partial sectional view, corresponding to FIG. 7, schematically illustrating a status where the stylus pen is pushed inward.

As shown in FIG. 12, a reaction force against the aforementioned torsion allows the first and second tip ends 53, 67 to return to the second level 58. The second tip end 67 is received in the second vertical groove 71. When the stylus pen 21 is released from the urging force, the elastic or resilient force of the coil spring 47 acts on the movable block 46. The second tip end 67 is in this manner forced to move to the depression 72 along the vertical groove 71. Simultaneously, the first tip end 53 moves to the depression 62 along the vertical groove 61. While the first tip end 53 is received in the depression 62, the second tip end 67 is received in the depression 72. Since the coil spring 47 serves to generate a driving force applied to the movable block 46 in the forward direction, the first and second tip ends 53, 67 are reliably held in the depressions 62, 72.

Figure 13:
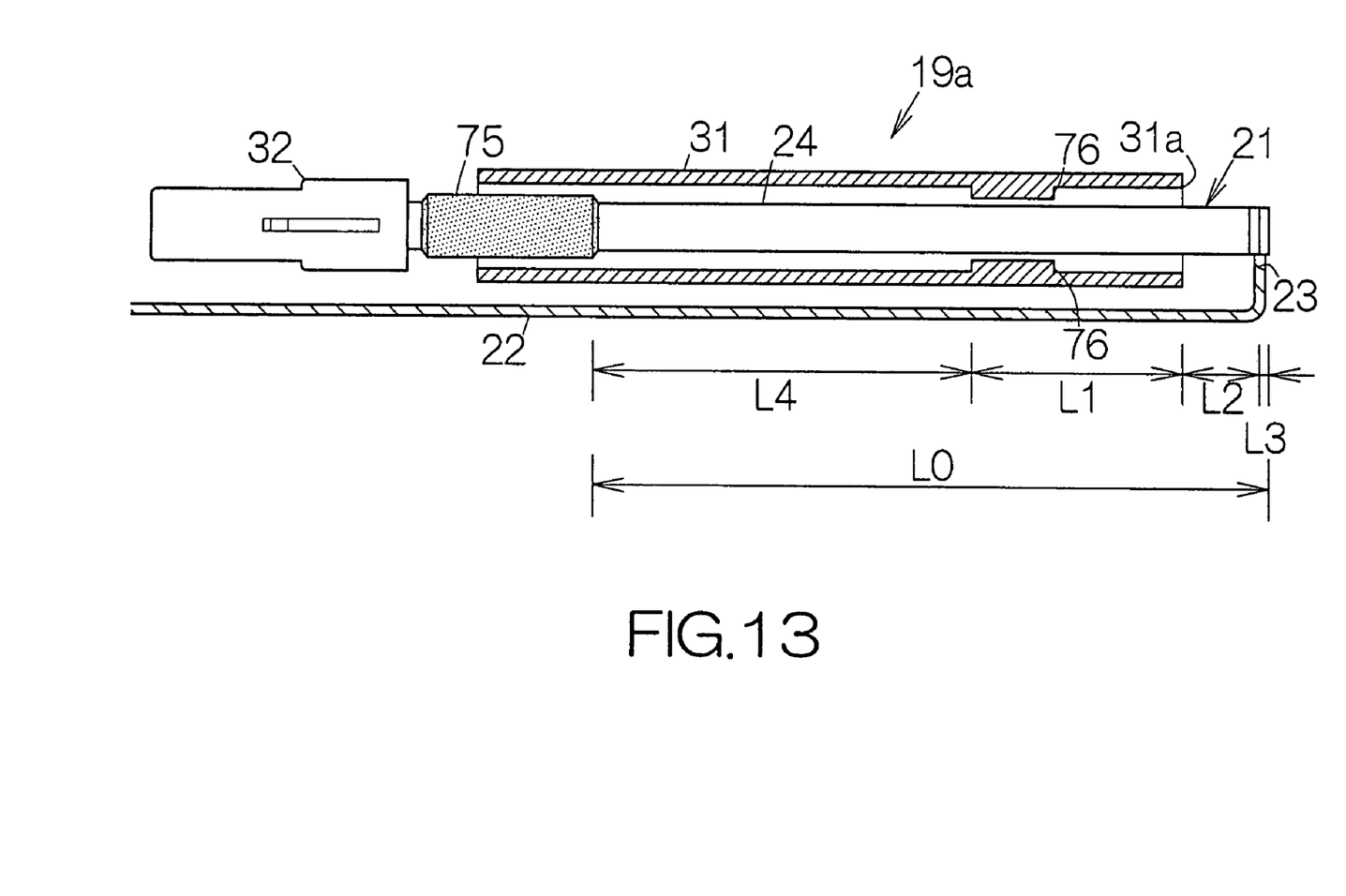
FIG. 13 is a partial sectional view, corresponding to FIG. 4, schematically illustrating a pen unit according to another embodiment of the present invention.

As shown in FIG. 13, a large-diameter member 75 made of an elastic body may be attached to the shaft 24 in place of the aforementioned large-diameter member 28. An adhesive may be employed to attach the large-diameter member 75. The large-diameter member 75 may be formed in the shape of a cylinder, for example. The elastic body may be made of an elastic resin material such as a rubber sponge, for example. When the large-diameter member 75 is utilized as the grip of the stylus pen 21, a user is allowed to enjoy a good feeling for holding the stylus pen 21 in his/her hand.

Narrowed path members 76 may be formed integral with the unit body 31 as a one-piece component in place of the narrowed path members 33. A molding process may be employed to form such a one-piece component. The unit body 31 and the narrowed path members 76 may be made of a resin material, for example. The structure of the narrowed path members 76 may be identical to that of the narrowed path members 33. Like reference numerals are attached to the structure or components equivalent to those of the aforementioned embodiment. Such a pen unit 19a is allowed to enjoy the advantages identical to those obtained in the aforementioned pen unit 19.

Figure 14:
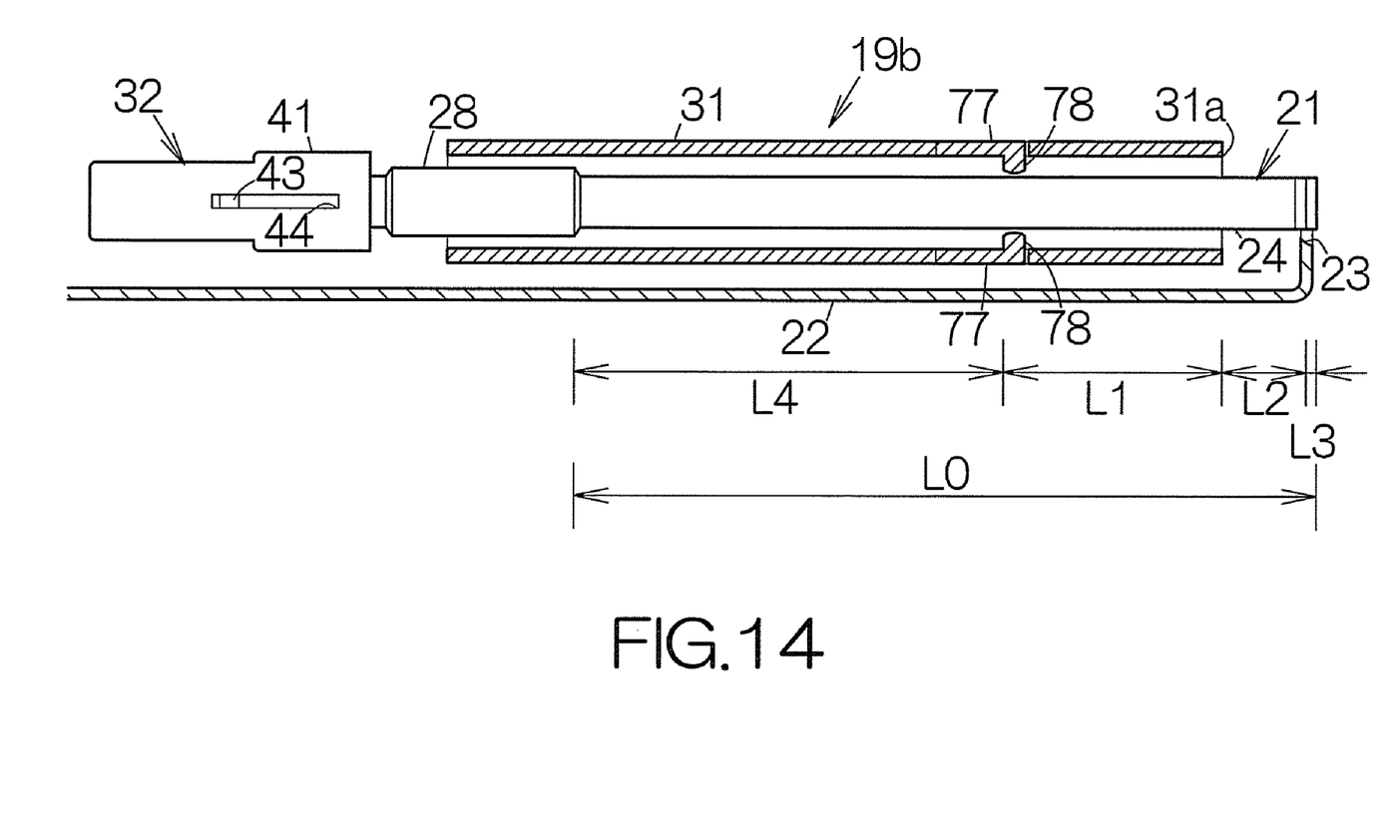
FIG. 14 is a partial sectional view, corresponding to FIG. 4, schematically illustrating a pen unit according to still another embodiment of the present invention.

As shown in FIG. 14, narrowed path members 77, 77 may be placed in the inner space of a pen unit 19b. The narrowed path members 77 are formed integral with the unit body 31 as a one-piece component. A molding process may be employed to form such a one-piece component. The unit body 31 and the narrowed path members 77 may be made of a resin material, for example. The bottom ends of the narrowed path members 77 are connected to the unit body 31. A protrusion or protrusions 78 are defined in the tip end of the individual narrowed path member 77. The protrusion 78 is designed to protrude toward the outer peripheral surface of the shaft 24. The elastic deformation of the bottom end of the narrowed path member 77 allows the pivotal movement of the protrusion 78 around the bottom end of the narrowed path member 77.

Determination of the protruding amount of the stylus pen 21, namely of the distance L3 between the rear end of the stylus pen 21 and the opening 23, when the pen holding mechanism 32 holds the stylus pen 21, leads to determination of the distance L4 between the rear end of the large-diameter member 28 and the front ends of the protrusions 78 of the narrowed path members 77 based on the distances L0, L1, L2 and L3 in the same manner as described above. When the stylus pen 21 is held at the pen holding mechanism 32, the protrusions 78 of the narrowed path members 77 are placed within the inner space at a position spaced from the large-diameter member 28 by the distance L4 between the large-diameter member 28 and the opening 23. Like reference numerals are attached to the structure or components equivalent to those of the aforementioned embodiment.

Figure 15:
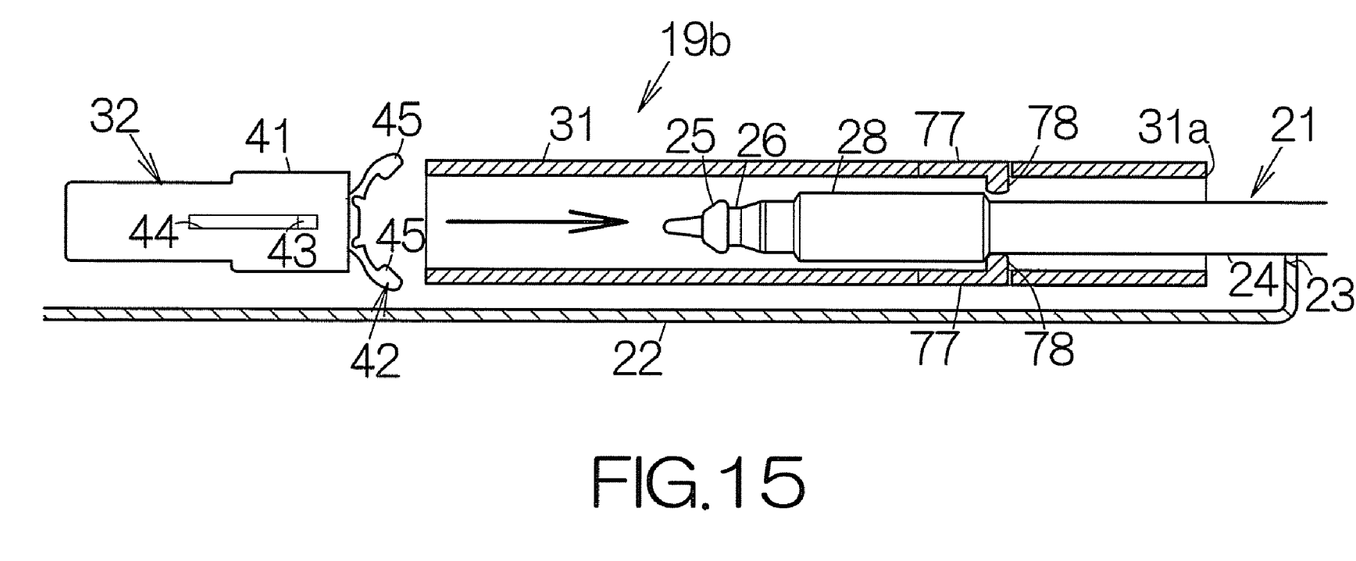
FIG. 15 is a partial sectional view, corresponding to FIG. 6, schematically illustrating a status where the rear end of the large-diameter member contacts with the front ends of the narrowed path members.

Now, assume that the stylus pen 21 is pulled out of the inner space. When a user pushes the rear end of the stylus pen 21 to allow stylus pen 21 to move into the pen holding mechanism 32 against the elastic or resilient force of the coil spring 47, the pen holding mechanism 32 serves to apply a driving force to the tip end of the stylus pen 21 to direct the stylus pen 21 toward the opening 23. No guiding member guides the movement of the stylus pen 21. The attitude of the stylus pen 21 is thus allowed to change inside the inner space. The longitudinal axis of the stylus pen 21 is hardly aligned with the intermediate position between the protrusions 78, 78 of the narrowed path members 77, 77. When the longitudinal axis of the stylus pen 21 in this manner deviates from the intermediate position, the rear end of the large-diameter member 28 inevitably contacts with the front ends of the protrusions 78 of the narrowed path members 77, as shown in FIG. 15. This results in restriction of the movement of the stylus pen 21. The stylus pen 21 is reliably prevented from dropping out of the opening 23.

Figure 16:
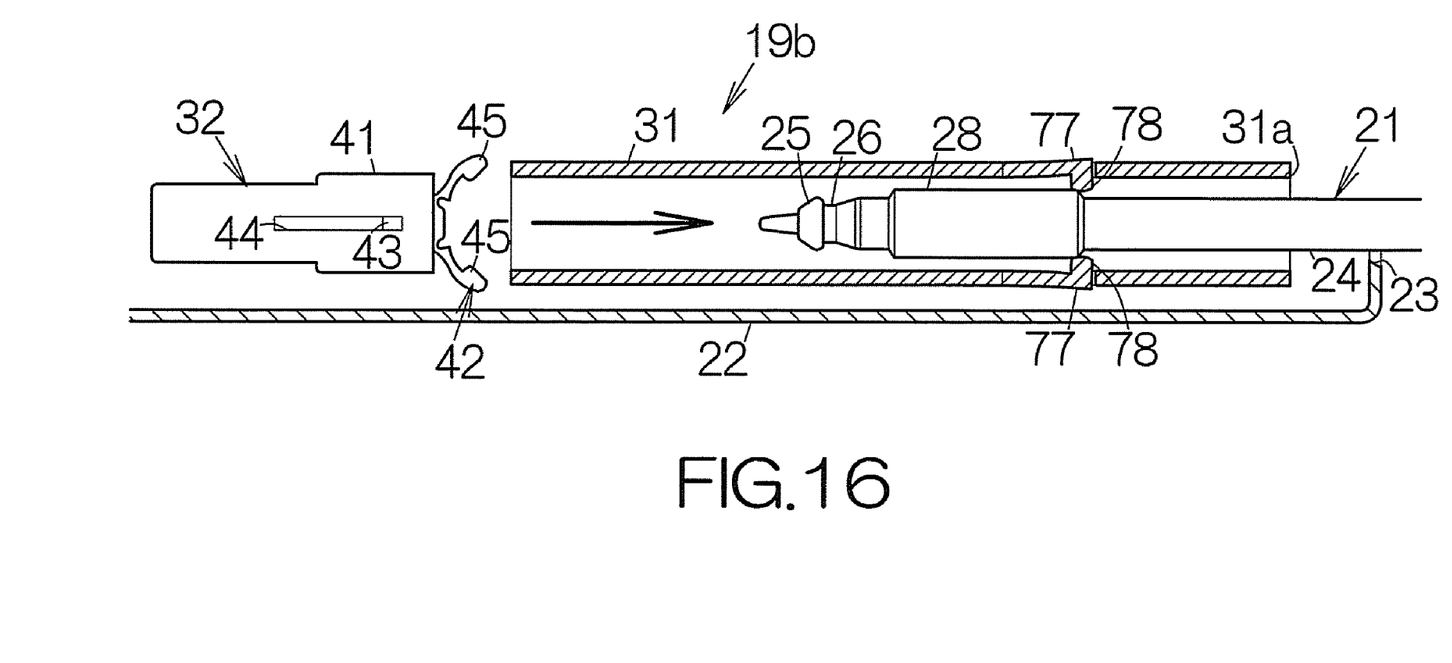
FIG. 16 is a partial sectional view, corresponding to FIG. 6, schematically illustrating a status where the stylus pen is pulled out.

When the stylus pen 21 is held at the pen holding mechanism 32 as described above, the distance L4 is established between the rear end of the large-diameter member 28 and the front ends of the protrusions 78. The movement distance of the large-diameter member 28 or stylus pen 21 corresponds to the distance L4. The stylus pen 21 is thus allowed to reliably protrude out of the opening 23 of the enclosure 22 by the length of (L4+L3). A user can pinch the shaft 24 with his/her fingers. The user can then pull the stylus pen 21 out of the opening 23. The large-diameter member 28 is allowed to pass through a space between the protrusions 78 of the narrowed path members 77, 77 based on the elastic deformation of the bottom ends of the narrowed path members 77, 77. The stylus pen 21 can thus completely be pulled out of the opening 23.

Next, assume that the stylus pen 21 is inserted into to the inner space. The tip end of the stylus pen 21 is inserted into the inner space through the opening 23. The rear ends of the protrusions 78 of the narrowed path members 77, 77 contact with the front end of the large-diameter member 28. When a user further pushes the stylus pen 21 inward, the large-diameter member 28 is allowed to pass through a space between the protrusions 78, 78 of the narrowed path members 77, 77 based on the elastic deformation of the bottom ends of the narrowed path members 77, 77. The tip end of the stylus pen 21 in this manner reaches the pen holding mechanism 32. The pen holding mechanism 32 then catches the tip end of the stylus pen 21.

The aforementioned pen units may be incorporated in any electronic apparatus other than the notebook personal computer 11, such as a tablet computer, a personal digital assistant (PDA) or a mobile phone terminal, for example.

What is claimed is:

1. A pen unit comprising:
 a unit body defining an inner space extending from an opening in one direction;
 a pen having a portion with a first diameter and a larger diameter member extending outward from a peripheral surface of the portion by a predetermined amount;
 a retention member configured to temporarily hold the pen in the inner space after being received through the opening;
 a driving mechanism configured to apply a driving force to the pen to direct the pen toward the opening; and
 a narrowed path member placed within the inner space at a position spaced from the larger diameter member, between the larger-diameter member and the opening, when the retention member holds the pen, the narrowed path member restricts the opening and interferes with the larger-diameter member when the pen is released from the retention member, but still allowing the larger-diameter member to be removed from the inner space.

2. The pen unit according to claim 1, wherein the narrowed path member is made of an elastic body.

3. The pen unit according to claim 1, wherein the larger-diameter member is a separate member mounted on the pen.

4. The pen unit according to claim 3, wherein the larger-diameter member is made of an elastic body.

5. The pen unit according to claim 4, wherein the larger-diameter member is utilized as a grip of the pen.

6. The pen unit according to claim 1, wherein the larger-diameter member is formed integral with the pen.

7. The pen unit according to claim 1, wherein the retention member is configured to hold a tip end of the pen, and the driving mechanism is configured to apply a driving force to the tip end of the pen.

8. An electronic apparatus comprising:
 an enclosure;
 a main body in the enclosure defining an inner space extending in one direction from an opening defined in the enclosure;
 a pen having a portion with a first diameter and a larger diameter member extending outward from a peripheral surface of the portion by a predetermined amount;
 a retention member configured to temporarily hold the pen in the inner space after being received through the opening;
 a driving mechanism configured to apply a driving force to the pen to direct the pen toward the opening; and
 a narrowed path member placed within the inner space at a position spaced from the larger diameter member, between the larger-diameter member and the opening, when the retention member holds the pen, the narrowed path member restricts the opening and interferes with the larger-diameter member when the pen is released from the retention member, but still allowing the larger-diameter member to be removed from the inner space.

9. The electronic apparatus according to claim 8, wherein the narrowed path member is made of an elastic body.

10. The electronic apparatus according to claim 8, wherein the larger-diameter member is a separate member mounted on the pen.

11. The electronic apparatus according to claim 10, wherein the larger-diameter member is made of an elastic body.

12. The electronic apparatus according to claim 11, wherein the larger-diameter member is utilized as a grip of the pen.

13. The electronic apparatus according to claim 8, wherein the larger-diameter member is formed integral with the pen.

14. The electronic apparatus according to claim 8, wherein the retention member is configured to hold a tip end of the pen, the driving mechanism configured to apply a driving force to the tip end of the pen.

15. The pen unit according to claim 1, wherein the narrowed path member is spaced by a predetermined distance from the larger-diameter member when the retention member holds the pen, and the narrowed path member contacts the larger-diameter member when the pen has moved by the predetermined distance, after the pen has been released from the retention member.

16. The pen unit according to claim 1, wherein the retention member is configured to advance toward the opening from a first position where the retention member holds the pen to a second position where the retention member releases the pen, the narrowed path member being spaced from the larger-diameter member by a distance larger than an amount of advancement of the retention member, when the retention member at the first position holds the pen, and the narrowed path member contacts the larger-diameter member, when the pen has moved by the distance after the pen has been released from the retention member.

17. The electronic apparatus according to claim 8, wherein the narrowed path member is spaced by a predetermined distance from the larger-diameter member when the retention member holds the pen, and the narrowed path member contacts the larger-diameter member when the pen has moved by the predetermined distance after the pen has been released from the retention member.

18. The electronic apparatus according to claim 8, wherein the retention member is configured to advance toward the opening from a first position where the retention member holds the pen positioned within the inner space to a second position where the retention member releases the pen, the narrowed path member being spaced from the larger-diameter member by a distance larger than an amount of advancement of the retention member, when the retention member at the first position holds the pen, and the narrowed path member contacts the larger-diameter member, when the pen has moved by the distance after the pen has been released from the retention member.

19. A pen unit comprising:
   an unit body having an opening from which extends an elongated inner space;
   an elongated pen having a tip, a portion with a first diameter and a larger diameter portion between the tip and the first diameter portion;
   a movable retention member to temporarily hold the tip of the pen in the inner space;
   a mechanism to urge the pen out of the opening; and
   a narrowed path member placed within the inner space to constrict the inner space, the member being between the larger-diameter portion and the opening, when the retention member holds the tip of the pen,
   wherein, when the mechanism urges the pen towards the opening, the narrowed path member interferes with the larger-diameter portion to avoid inadvertent removal of the pen from the inner space, but still allows the larger-diameter portion to be intentionally removed from the inner space.

20. The pen unit recited by claim 19, wherein the narrowed path member is a pair of narrowed path members located opposite each other on an inner surface of the inner space.

21. The pen recited by claim 19, wherein the narrowed path member is made of an elastic resin material.

22. The pen recited by claim 20, wherein the pair of narrowed path members is attached to the inner space by adhesive.

23. The pen recited by claim 19, wherein the narrowed path member is a deflectable member formed integrally with the inner space to extend into the inner space.

24. The pen recited by claim 19, wherein the narrowed path member is formed integrally as a resilient member on an inner surface of the inner space.

25. An electronic apparatus comprising:
   an unit body having an opening from which extends an elongated inner space;
   an unit body having an opening from which extends an elongated inner space;
   an elongated pen having a tip, a portion with a first diameter and a larger diameter portion between the tip and the first diameter portion;
   a movable retention member to temporarily hold the tip of the pen in the inner space;
   a mechanism to urge the pen out of the opening; and
   a narrowed path member placed within the inner space to constrict the inner space, the member being between the larger-diameter portion and the opening, when the retention member holds the tip of the pen,
   wherein, when the mechanism urges the pen towards the opening, the narrowed path member interferes with the larger-diameter portion to avoid inadvertent removal of the pen from the inner space, but still allows the larger-diameter portion to be intentionally removed from the inner space.

26. The pen unit recited by claim 25, wherein the narrowed path member is a pair of narrowed path members located opposite each other on an inner surface of the inner space.

27. The pen recited by claim 25, wherein the narrowed path member is made of an elastic resin material.

28. The pen recited by claim 26, wherein the pair of narrowed path members is attached to the inner space by adhesive.

29. The pen recited by claim 25, wherein the narrowed path member is a deflectable member formed integrally with the inner space to extend into the inner space.

30. The pen recited by claim 25, wherein the narrowed path member is formed integrally as a resilient member on an inner surface of the inner space.

* * * * *